(No Model.)
P. MILES.
Apparatus for Bottling or Canning Substances.
No. 228,828. Patented June 15, 1880.
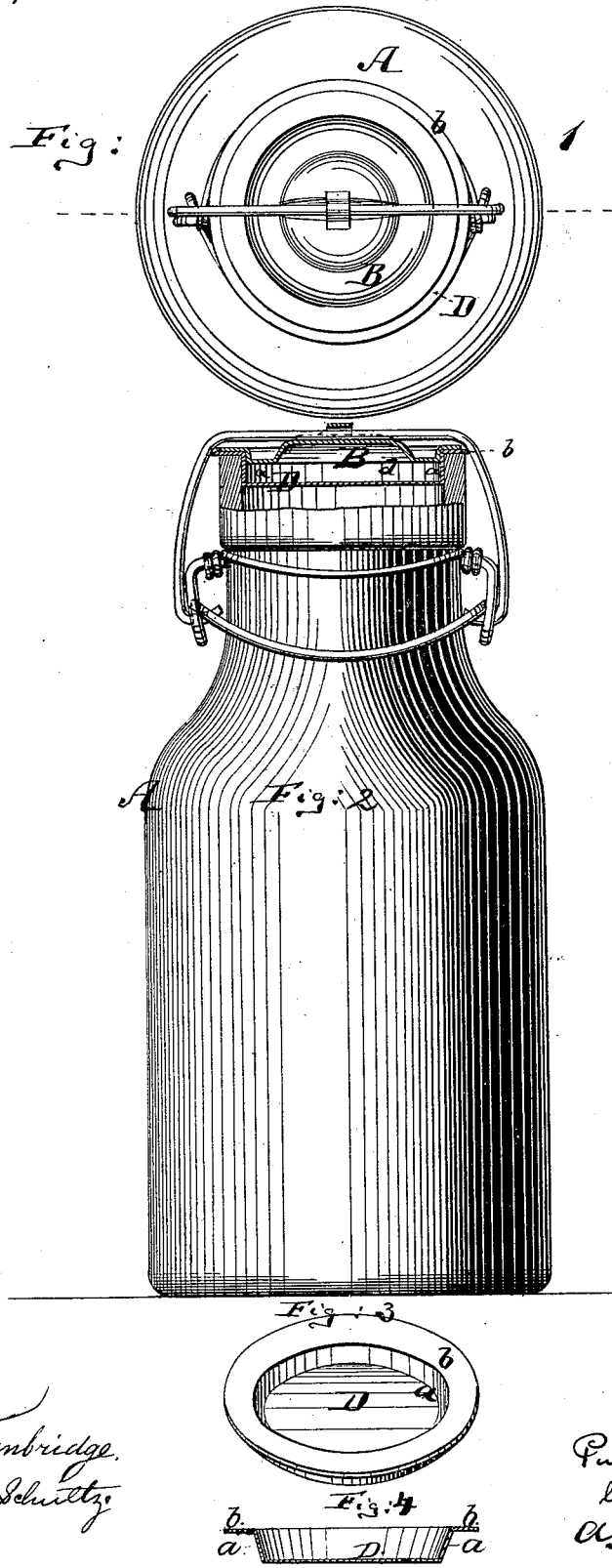
Witnesses:
John C. Tunbridge
Willy G. E. Schultz
Inventor:
Purches Miles
by his attorney
A. v. Briesen

UNITED STATES PATENT OFFICE.

PURCHES MILES, OF BROOKLYN, NEW YORK.

APPARATUS FOR BOTTLING OR CANNING SUBSTANCES.

SPECIFICATION forming part of Letters Patent No. 228,828, dated June 15, 1880.

Application filed April 17, 1880. (No model.)

*To all whom it may concern:*

Be it known that I, PURCHES MILES, of Brooklyn, in the county of Kings and State of New York, have invented a new and Improved Apparatus for Bottling or Canning Substances, of which the following is a specification.

My invention relates to an improvement in bottling or canning substances, such as milk, fruit, preserves, fermenting liquids, and the like.

The object of the invention is to prevent the agitation and movement of the contents of the vessel during transportation or handling, and to prevent the generation of gases within the vessel, and also to assist in sealing the vessel.

My invention consists, principally, in interposing between the cover or lid and the contents of the vessel a hollow flexible detached cap, which is to fill the entire space between the contents and the cover or lid, and which helps form an air-chamber, that acts as a cushion on top of the contents.

The invention also consists in providing said flexible cap with a flange, to serve as a packing-ring, on the edge of the vessel.

In the accompanying drawings, Figure 1 is a top view of a milk-jar having my improvement. Fig. 2 is a sectional elevation thereof. Fig. 3 is a perspective view of the flexible cap which I apply to the cover or lid. Fig. 4 is a detail central section thereof.

Referring to the drawings, A represents a jar or other suitable vessel for receiving milk or other substance to be preserved. B is the cover, lid, or stopper, of suitable kind. D represents a saucer-shaped cap, the depressed part *a* whereof is on top, of about the same diameter as the internal diameter of the mouth or opening of the vessel A; but the depression *a* is preferably tapering, so that the pressure of the liquid within the vessel A will expand it slightly and make it assist in closing the vessel by contact with the inner walls thereof.

The flange *b* of the cap D is adapted to rest on the edge or rim of the vessel and come under the cover B, to serve as a packing. The cap I prefer to make of paper or similar flexible fabric, coated or saturated with paraffine or other liquid-repelling substance; but substance like thin india-rubber may also be used. It is essential that the cap D should not let air nor liquid into or out of the vessel.

The chamber *d*, formed in the cap D, between its depressed part *a* and the cover or stopper B, is an air-chamber, and also serves as a cushion, pressing upon and receiving the pressure of the contents of the vessel.

The vessel A is filled with milk or other substance full as it will hold. The cap D is then placed upon the vessel, so that the part *a* displaces as much of the milk or other substance as is necessary to enable the part *a* of the cap to enter the vessel. The flange *b* rests on the upper edge of the vessel.

When the cover B is applied it clamps the flange *b* against the top of the vessel, making an air and liquid tight joint, and the bottom of the part *a* is pressed on top of the milk or other contents direct. This prevents the contents from being shaken or agitated within the vessel, however much the vessel itself may be shaken in transportation, handling, &c. The air in the chamber *d* keeps the cupped part *a* of the cap distended and its sides in contact with the inside walls of the mouth, so that there is no liability of a space being formed in which the milk will have liberty to move about by the collapsing of the cap. The cap, with its air-chamber, also serves as a cushion to gently press on the contents of the vessel and prevent the generation of gases, the milk from churning, or other injury to the contents.

By making the cap D of paraffined paper it is inexpensive, light, flexible, and water-proof, and easily replaced when the vessel is to be used again.

I do not limit myself to the use of a flange on the cap D, nor to the material of which said cap is made, as long as it is flexible, nor to any vessel, cover, stopper, or lid in connection with which it is used.

I wish to state, further, that the air-chamber, should the liquid expand under the influence of heat or otherwise, will yield and preserve the vessel from bursting.

The cap D is thrown away as soon as the bottle is opened, and is easily replaced by another, when the bottle is again filled and closed.

I am aware that perforated lids have already been used in combination with elastic bags for closing vessels. This I do not claim.

I claim—

1. The solid lid or cover of a vessel, combined with the detached flexible hollow cap D, which is clamped and held against the vessel by the pressure of said cover, and forms an air-chamber, $d$, substantially as herein shown and described.

2. The apparatus described for sealing vessels, said apparatus consisting of a solid cover or lid, and of a detachable flanged cap, D, of flexible material, said cap being clamped between the vessel and the cover to expose its bottom and its upright walls to the expanding action of the confined liquid, substantially as specified, its flange meanwhile serving as a packing, as set forth.

PURCHES MILES.

Witnesses:
WILLY G. E. SCHULTZ,
WILLIAM H. C. SMITH.